United States Patent

Doering

[15] 3,655,976

[45] Apr. 11, 1972

[54] FREQUENCY STANDARDIZED PENETRATING RADIATION GAUGE

[72] Inventor: George I. Doering, Columbus, Ohio

[73] Assignee: Industrial Nucleonics Corporation

[22] Filed: Oct. 11, 1967

[21] Appl. No.: 674,434

[52] U.S. Cl.....................250/83.3 D, 250/83 C, 250/83.6 R
[51] Int. Cl............................................G01t 1/16
[58] Field of Search...................250/83.3 D, 83.6, 83 C

[56] References Cited

UNITED STATES PATENTS

| | | | |
|---|---|---|---|
| 2,536,617 | 1/1951 | Weller | 330/97 |
| 3,049,621 | 8/1962 | Spooner | 250/83.3 |
| 3,281,676 | 10/1966 | Ko-Hsin Liu | 324/57 |
| 2,829,268 | 4/1958 | Chope | 250/83 C UX |
| 3,082,323 | 3/1963 | Chope et al. | 250/83.3 D X |
| 3,387,133 | 6/1968 | Chope | 250/83.3 D |

OTHER PUBLICATIONS

" Instrument Dynamics for On-Line Measurements"; Chope; H. R., ISA Journal, Sept., 1963.
" Hgh Speed Electrometers for Rocket & Satellite Experiments," J. Praglini et al., Proceedings of the TRE; Apr., 1960.

Primary Examiner—James W. Lawrence
Assistant Examiner—Morton J. Frome
Attorney—William T. Fryer, III, Henry Peterson, James J. O'Reilly and Allan M. Lowe

[57] ABSTRACT

Disclosed are a system for and method of standardizing the frequency response of a plurality of thickness measuring radiation gauges, having resistance capacitance networks connected to the outputs thereof. Each gauge is source and zero standardized by adjusting a potentiometer in the feedback loop of an amplifier and the zero point of the amplifier, respectively. Thereafter, each gauge is frequency standardized by adjusting the time constant of frequency determining impedances. The determination of the frequency response of each gauge is made by modulating the gauge characteristics and measuring the reduction in amplitude of the gauge output relative to D.C.

1 Claim, 4 Drawing Figures

INVENTOR
GEORGE I. DOERING

BY *Allan M. Lowe*

ATTORNEY

FIG. 3

INVENTOR
GEORGE I. DOERING

BY

ATTORNEY

FIG. 4

INVENTOR
GEORGE I. DOERING

FREQUENCY STANDARDIZED PENETRATING RADIATION GAUGE

The present invention relates generally to industrial process measuring and control systems and more particularly to an apparatus for and method of standardizing a radiation gauge system by adjusting the frequency response thereof.

Radiation gauges are commonly utilized, for example, for measuring the weight per unit area, or density, of a material, while it is being manufactured. These gauges are generally of the type that emit X-rays, gamma rays, beta rays, or other forms of penetrating nucleonic radiation. Beta gauges, for example, generally comprise a source of radioactive material, in the form of beta particle emissive substance. Some of the beta particles pass through the material being measured to irradiate an ionization radiation detector. The number of particles impinging on the ionization detector is determined, inter alia, by the weight per unit area of a material positioned between the source and ionization gauge, whereby the detector output current is a function of material thickness, if density is known, and density, if thickness is known. Beta gauges of this type are frequently employed for measuring the weight per unit area of paper during manufacture, the density of tobacco in a cigarette rod being processed, the thickness of plastic sheets, etc. X-rays are generally utilized for determining the properties of the same products that are monitored with beta gauges, while gamma radiation is often employed to measure denser materials, such as steel.

Radiation gauges, being located in industrial processing plants, are subject to wide fluctuations in the parameters thereof as a function of time. In the past, radiation gauge systems have been zero and source standardized to compensate for drift in amplifiers thereof, and variations in gauge current. Gauge current changes occur because of the inherent exponential decay of a radiation source, alterations in barometric pressure of the air between a detector and radiation source, and the build-up of dirt between the detector and source. The latter factor is of particular consequence in industrial manufacturing operations, such as paper making and steel mills, where no attempt is made to obtain a sterile environment. Source and zero standardization of radiation gauges may be accomplished at will, either manually, semi-automatically, or automatically, as described in U.S. Pat. No. 2,829,268, issued to Chope and commonly assigned with the present application. In industrial manufacturing facilities, it is necessary to zero and source standardize on a frequent periodic basis, such as every half hour, whereby the automatic standardization procedure is preferred.

In the past, it has generally been assumed that the frequency response of all radiation gauges is substantially identical, or that frequency response is not a particularly significant parameter. It has now been found, however, that these prior art assumptions are erroneous, whereby different radiation gauges have different frequency responses and frequency response is an important parameter in determining the characteristics of a product being manufactured. Frequency response is an important parameter because spectral information can provide additional data regarding the operation of the process. For example, in a paper making facility, if a particular frequency component becomes predominant, a trained observer can be informed that a malfunction is probably occurring at a particular point in the process.

Since the spectral information provides information regarding the manner in which a process is functioning, it is necessary for a radiation gauge to be calibrated with regard to frequency, i.e., frequency standardized, so that the gauge has a predetermined, known amplitude versus frequency characteristic. Frequency standardization is necessary because each gauge includes electrical circuit elements of a reactive nature, namely elements having resistive and capacitive components simulating a low pass filter. The resistive components are subject to considerable variations that induce changes in the cut-off frequencies of the filter. Furthermore, the gauges inherently exhibit a reactive electrical characteristic which differs from one gauge to another. Hence, different gauges are likely to derive voltages of different amplitudes in response to property variations of the same magnitude and frequency in the article being analyzed.

There are a number of gauge system components that change frequency response. One of the most significant radiation gauge system components that is subject to variation in a beta gauge, for example, is an extremely large resistance, commonly referred to as a high-meg resistor, connected to the output of an ionization detector such as in shunt with the output thereof. The high-meg resistor has a value on the order of $2 \times 10^9$ to $5 \times 10^9$ ohms, a requirement dictated by the low current generated by the ionization detector to enable the generation of a significant voltage level that can be detected. Resistance values on the order of magnitude required for the high-meg resistor are generally not manufactured to great tolerances, whereby the initial values of resistances connected in different gauges are different. The high-meg resistor is also subject to considerable change in value as a function of ambient conditions, such as temperature and moisture. The high-meg resistor directly controls the gauge response since it is connected in shunt with a smoothing capacitor to form a circuit having a response time on the order of a second. The shunting capacitor is required to smooth variations in the ionization gauge output resulting from the statistical distribution of particles from the radiation source. Because the smoothing capacitor is connected in shunt with the high-meg resistor, variations in the value of the high-meg resistor are directly reflected in the time constant, hence frequency response, of the gauge system.

A second source of frequency response variation between different radiation gauges, again using the beta gauge as an example, is in a lengthy cable connecting the ionization detector to the input terminals of an amplifier, remotely located from the gauge station. Cables connecting the ionization detector and amplifier input terminals together are of differing lengths, whereby the shunt capacity at the input terminals of the amplifier is different from one gauge installation to the next and is not readily ascertained on a predetermined basis. The cable connecting the ionization detector and amplifier together therefore introduces differences in the response of each gauge system.

According to the present invention, a method and system are provided for frequency response standardization of a radiation gauge. Thereby, the characteristics of a radiation gauge are maintained uniformly consistent to a given property over an extended period of operation, by zero, source and frequency standardizing the gauge. With the gauge zero and source standardized, the gauge response is modulated at a predetermined frequency or group of frequencies, and an indication of the attenuation introduced by the gauge on the modulation components is obtained. If the gauge output indication differs from a desired, predetermined level at the modulation frequencies, frequency determining elements of the gauge are varied, either by hand or automatically, to correct the gauge output indication to the desired response level for that frequency.

The present invention has particular utility in multi-gauge systems wherein a plurality of gauges feed a single data processing system on a time division multiplex basis. The importance of frequency standardizing gauges in a multi-gauge system feeding a single computer enables identical information regarding each gauge to be derived from the single computer.

According to one embodiment of the invention, with the radiation gauge zero and source standardized, frequency standardization is accomplished with a modulating test signal generator connected with the high-meg resistor and shunting capacitor, at a node removed from the high impedance output of the radiation detector. The modulating source is typically a voltage generator that must not be connected across the detector output, in order to avoid the connection of a low impedance across the high-meg resistor. The modulating source is set at a standard frequency and the system response is adjusted to provide the desired frequency gain characteristics desired. In the alternative, the modulation signal source frequency can be swept continuously over a frequency range of interest to enable a gain adjustment responsive to several frequencies, or the frequency range can be varied to obtain gain adjustments at several discrete frequencies. According to another embodiment of the invention, a shutter is rotated at a predetermined frequency between the radiation source and ionization detector, whereby a predetermined signal frequency is generated by the ionization detector.

It is, accordingly, an object of the present invention to provide a new and improved system for and method of standardizing a radiation gauge for an industrial process measurement.

Another object of the present invention is to provide a system for and method of standardizing a number of radiation gauges to standardize the response thereof in a more complete manner than heretofore employed.

A further object of the invention is to provide a system for and method of obtaining a uniform indication of a given property measurement from a plurality of gauges installed on a process, to permit accurate data analysis of the process variable being measured.

An additional object of the present invention is to provide a system for and method of standardizing the characteristics of a radiation gauge, including the frequency response thereof.

Another object of the present invention is to provide a system for automatically standardizing a radiation gauge, including the frequency response thereof.

The above and still further objects, features and advantages of the present invention will become apparent upon consideration of the following detailed description of several specific embodiments thereof, especially when taken in conjunction with the accompanying drawings, wherein.

Figures 1, 2:
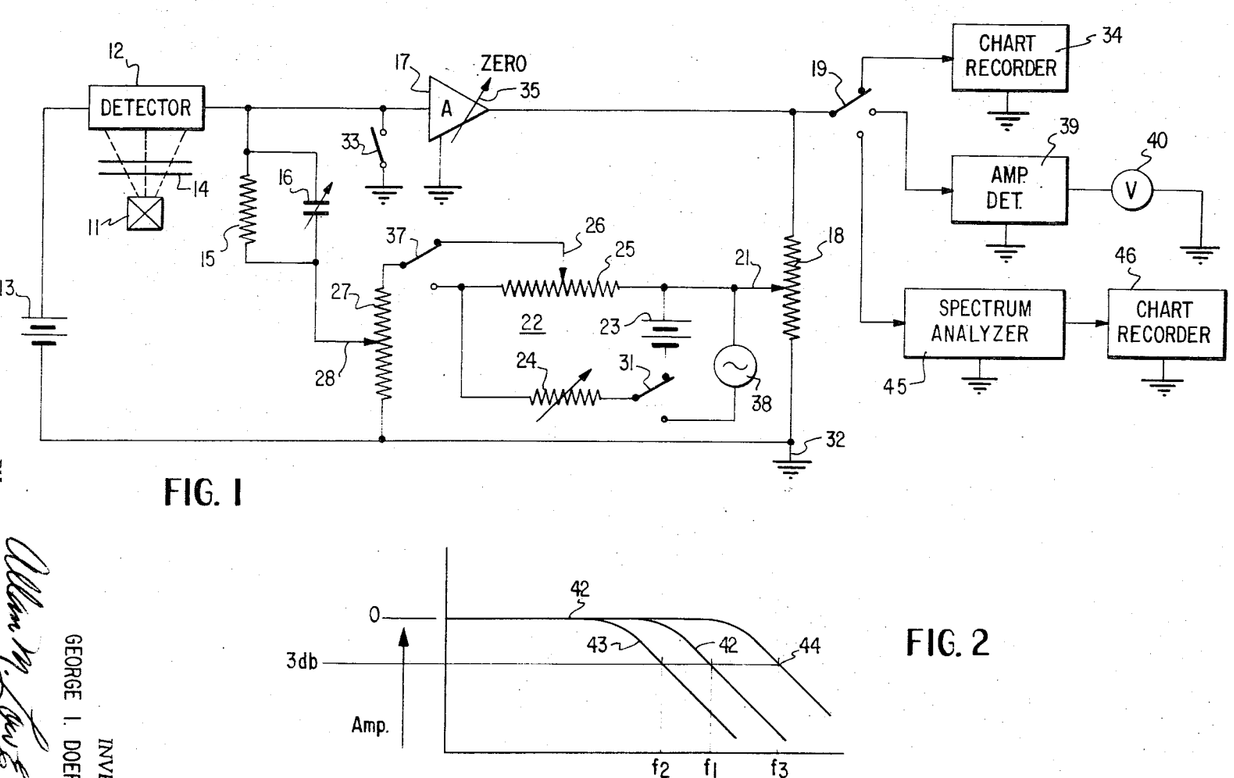
FIG. 1 is a circuit diagram of one preferred embodiment of the apparatus of the present invention.
FIG. 2 is a chart of amplitude versus frequency indicating the responses of the gauge stations of FIG. 1.

Reference is now made to FIG. 1 of the drawings, wherein a source 11 of penetrative radiation is provided. While radiation source 11 hereafter is frequently referred to as being a beta particle source, it is to be understood that other types of penetrative radiation, such as X-rays or gamma rays, can be employed. Penetrative radiation particles from source 11 are directed to beta particle ionization detector 12, a constant current source deriving a current magnitude dependent upon the number of beta particles received thereby, regardless of the impedance of the circuit it is driving. Excitation for ionization source 12 is from the relatively high voltage (300 volts, for example) of D.C. source 13.

In normal operation, particles from beta radiation source 11 are intercepted by article 14, the weight per unit area of which is being measured, whereby ionization source 12 derives a current inversely related to the density and thickness of article 14. Typically, article 14 is a web of paper, plastic or steel or a cigarette rod, during manufacture.

The current generated by ionization source 12 is fed across high-meg resistor 15, having a value on the order of $5 \times 10^9$ ohms, and designed to enable a detectable voltage to be derived from the extremely small current generated by source 12. Shunting high-meg resistor 15 is capacitor 16, having a value on the order of 200 picofarads ($2 \times 10^{-10}$ farads) for smoothing random fluctuations in the output voltage of ionization source 12 due to the Poisson distribution of particles from beta radiation source 11. The connection of resistor 15 and capacitor 16 across the output terminals of ionization detector 32 establishes a time constant for the detector on the order of 1 second. Because resistor 15 has such a large value, it cannot be manufactured to very rigid tolerances and is susceptible to variations while in use because of ambient conditions, such as moisture and temperature. Hence, the time constant of the circuit connected across the output terminals of ionization detector 13 is not known exactly, a priori, and the gauge frequency response is uncertain.

In normal operation, the voltage developed across high-meg resistor 15 and capacitor 16 is coupled to the input terminal of D.C., operational amplifier 17. Amplifier 17 is of the well-known type, having a very large input impedance, a gain on the order of 10,000 or more, and polarity inverting properties, whereby its net input voltage and current are substantially nil. The output terminal of amplifier 17 is connected across potentiometer 18 and to selector switch 19, which feeds signal analyzing elements described infra. Generally, the signal analyzing elements are remotely located from the gauge elements, including detector 12, amplifier 17 and the circuitry associated therewith. The analyzing elements and gauge are therefore connected together via a relatively lengthy cable, not shown in FIG. 1, having distributed impedance parameters that affect the gauge station frequency response and are not readily ascertained.

Tap 21 of potentiometer 18 determines the sensitivity of the system response, known in the art as the system span. The voltage derived at tap 21 is added to the voltage derived by network 22, that includes D.C. source 23, normally connected in series with rheostat 24 and potentiometer 25 by the closed contacts of switch 31, as illustrated. Network 22 is provided to establish a zero output of amplifier 17 for some standardized condition of article 14 passing between source 11 and detector 12. As the weight per unit area of article 14 varies from the predetermined quantity established by network 22, the output of voltage amplifier 17 changes accordingly about a zero point. The zero point is effectively established by adjusting the value of rheostat 24 and the slider 26 of potentiometer 25 depending on the desired a priori density properties of article 14.

In normal operation, the D.C. voltage derived at tap 26 of potentiometer 25 is applied across the winding of potentiometer 27 having tap 28 for source standardization purposes. Tap 28 is connected to the low voltage junction of high-meg resistor 15 and capacitor 16, opposite from the connection of those elements to detector 12.

The circuit described to present is very similar to the circuit disclosed in the application of Paul H. Troutman, Ser. No. 616,958, filed Feb. 17, 1967, and assigned to the same assignee as the present invention. As indicated in the Troutman application, the output voltage of amplifier 17 can be represented as:

$$e_0 = \frac{1}{\alpha}\left(\frac{I_s Z_{in}}{\beta} - \gamma E_{25}\right) \qquad (1)$$

where:
$e_o$ = output voltage of amplifier 17;
$\alpha$ = percentage of the winding of potentiometer 18 between ground terminal 32 and slider 21;
$I_s$ = current supplied by detector 12 to the system;
$Z_{in}$ = impedance of resistor 15 and capacitor 16 in parallel;
$\beta$ = percentage of potentiometer 27 between tap 28 and ground 32;
$\gamma$ = percentage of potentiometer 25 between tap 26 and the end of the potentiometer connected to the positive terminal of D.C. source 23; and
$E_{25}$ = D.C. voltage established by source 23 and rheostat 24 across potentiometer 25.

As indicated by the Troutman application, Equation (1) is valid only when the radiation gauge is zero and source standardized.

Zero standardization is provided to compensate for the drift in the output voltage of amplifier 17 away from a null condition, assuming a zero input to the amplifier. Zero standardization is performed by closing normally open contact 33, connected across the input terminals of amplifier 17, and connecting switch 19 to voltage responsive chart recorder 34. With contacts 33 closed, the input voltage of amplifier 17 is stabilized at zero potential, whereby the amplifier output should also be at zero potential, as can be observed by inspecting the output of chart recorder 34. If amplifier 17 has drifted, as noted from chart recorder 34 while switch 33 is closed, a biasing resistor within amplifier 17 is adjusted by suitable means, such as indicated by arrow 35, until the chart recorder reading is zero.

Source stabilization is necessary because of the environmental changes in the medium coupling radiation from source 11 to detector 12 and because of the inherent decaying properties of the radiation source 11. The first operation in source standardization is to translate source 11 and detector 12 to a position remote from article 14 (referred to generally hereafter as an offsheet position), whereby the path between the source and the detector is theoretically at a standardized condition, that is approximately non-absorbent to penetrative radiation. In fact, however, because of deposition of dirt on the source and detector apertures and changes in atmospheric moisture and pressure between the source and detector, there is significant variation in the detector output under this "standardized" condition.

To compensate for these changes and source standardize the gauge with the gauge in an off sheet position, switch 37, normally connecting tap 26 to potentiometer 27 is activated so that the terminal between the end of potentiometer 25 and rheostat 24 is connected across potentiometer 27. Activating switch 37 adjusts the value of $\gamma$ in Equation (1) to unity and establishes a relatively large, predetermined voltage across the terminals of potentiometer 27. To complete source standardization, the position of potentiometer slider 28 is adjusted under a null, predetermined reading is obtained from chart recorder 34. Varying the position of tap 28 changes the value of $\beta$ in Equation (1) and establishes the same standardized characteristics for the gauge regardless of conditions between source 11 and the detector 12 for the "standardized" sheet location of the source and detector. Because the details of zero and source standardization are described with more explicitness in the previously mentioned Troutman application and Chope patent, a further description thereof is not deemed necessary herein. It should be recognized that the present invention utilizes other measuring circuits and that FIG. 1 shown in only an example.

In accordance with the invention, a gauge that is known to be source and zero standardized is thereafter frequency standardized, whereby the uncertain effects of high-meg resistor 15 and the cable connecting amplifier 17 to the signal analyzing equipment on the system frequency response is established. Broadly, frequency standardization involves modulating the gauge response with an A.C. signal to determine the amount by which the reactive components in the gauge and the cable connecting the gauge with signal analyzing circuitry attenuate the output signal and then adjusting a frequency determining component in the gauge so that the A.C. signal introduces a predetermined attenuation factor.

In the embodiment of FIG. 1, frequency standardization is accomplished through substitution of a generator, such as an A.C. signal generator 38, for D.C. source 23 by connecting the contacts of switch 31 so that generator 38 is connected to rheostat 24. Alternatively, generator 38 may be a pulse generator. The amplitude of the A.C. voltage derived from the gauge is ascertained with amplitude detector 39, having its output terminals connected to D.C. voltmeter 40 and its input terminals connected via switch 19 to the output terminal of amplifier 17.

To accomplish frequency standardization, the gauge must be zero and source standardized as indicated supra. After zero and source standardization, and with source 11 and detector 12 at an off sheet position, switch 37 is activated again to connect contact 26 to the ungrounded end of potentiometer 27. Switch 19 is activated to connect peak amplitude detector 39 and voltmeter 40 to the output of high gain, operational amplifier 17, while switch 31 is energized so that source 23 is connected to rheostat 24. Under such conditions, a positive, finite D.C. voltage is derived from amplifier 17, the magnitude of which is determined by reading voltmeter 40. The voltage magnitude read from meter 40 is represented as:

$$e_o = (E_{25}/\alpha)(1-\gamma) \quad (2).$$

Equation (2) represents the shift in the output voltage of amplifier 17 from the null output thereof during source standardization and is obtained by substitution into Equation (1):

$$Z_{in} = R_{15} \text{ and } \beta = (I_s \cdot R_{15})/(E_{25}.$$

$Z_{in} = R_{15}$ because no A.C. signal is now connected in the circuit, whereby the parallel impedance of resistor 15 and capacitor 16 consists solely of the value of resistor 15. The value of $\beta = (I_s R_{15})/E_{25}$ is derived from Equation (1), under the conditions of source standardization, wherein the output voltage, $e_o$, of amplifier 17 is zero and $\gamma = 1$.

The frequency response of the zero and source standardized gauge is now determined through substitution of A.C. source 38 for D.C. source 23 by changing the position of switch 31. The peak amplitude of source 38 is identical with the voltage of D.C. source 23, i.e., the peak-to-peak voltage of source 38 equals twice the voltage of source 23, whereby for very low frequency oscillations of source 38, the output of peak amplitude detector 39 is substantially the same as the output of the detector when D.C source 23 is connected in the circuit. For increasing frequencies of source 38, however, the reactive components in the network, such as capacitor 16, attenuate the voltage derived from the gauge, whereby the peak value of $e_o$, at the output terminal of amplifier 17, decreases.

In most gauges, wherein the frequency response can be considered as a simple low pass filter, the peak A.C. output voltage of amplifier 17 remains relatively constant until the frequency of source 38 approaches the 3 db cut-off frequency of the gauge, as determined to a large extent by the RC time constant of high-meg resistor 15 and capacitor 16. Therefore, A.C. source 38 comprises an oscillator having a peak signal amplitude equal to the voltage of source 23 and a single output frequency coincident with the designed 3 db frequency of the gauge. When connecting such a source into the network, by activating switch 31 from the position illustrated, a predetermined output voltage should be read from D.C. meter 40. If the voltage differs from the predetermined reading read from meter 40, a frequency determining component in the system is adjusted appropriately to change the system response until the predetermined voltage is read from meter 40. In the circuit of FIG. 1, the reactive component that is adjusted is capacitor 16, shunting the terminals of high-meg resistor 15. In other systems, however, other filtering networks having variable reactances can be included; for example, a low pass filter can be connected across the output terminals of amplifier 17.

To consider a pair of specific instances as to the manner in which the frequency response of the circuit of FIG. 1 is adjusted, reference is made to the amplitude versus frequency responses shown on FIG. 2. In FIG. 2, it is assumed that the desired response of the gauge of FIG. 1 is indicated by curve 42, which is relatively flat from D.C. to its $-3$ db point, at frequency $f_1$. From frequency $f_1$, curve 42 has an attenuation slope of 3 db per octave. Let it now be assumed that the gauge of FIG. 1 has the frequency response indicated by curve 43, whereby the gauge has a relatively flat response from D.C. to a mid-band region, from which the response falls off to a 3 db point at a frequency $f_2$, wherein $f_2 < f_1$. Beyond the 3 db point, curve 43 and the assumed gauge response falls off at the rate of 3 db per octave, similarly to the desired curve 42. The response of the gauge of FIG. 1 can be made to coincide with the desired curve by adjusting the value of capacitor 16 so that the RC time constant of high-meg resistor 15 and capacitor 16 is increased.

The determination that the gauge of FIG. 1 does not correspond with desired curve 42, but lies on a different curve, such as curve 43, is made by connecting source 38 in the circuit, in lieu of source 23, and setting the frequency of the generator 38 to frequency $f_1$ and the peak amplitude equal to the voltage of source 23. Under the assumed conditions, the reactive components in the network attenuate the frequency $f_1$ to a greater extent than a circuit having the desired response, indicated by curve 42, as shown by the intersection of curve 43 with the abscissa $f_1$. The degree of attenuation is determined with peak amplitude detector 39 and D.C. voltmeter 40. The value of capacitor 16 is now decreased without changing the frequency or amplitude of source 38, resulting in a larger amplitude A.C. output of amplifier 17, as indicated by voltmeter 40. When capacitor 16 has been adjusted properly, whereby the actual gauge response is indicated by curve 42, the voltage read from meter 40 coincides with the voltage at the −3 db point on curve 40 at frequency $f_1$. In a similar, but opposite manner, the value of capacitor 16 is reduced in the event that the gauge response is as indicated by curve 44, having a −3 db point at frequency $f_3$, which is greater than frequency $f_1$.

It will now be shown theoretically that the substitution of A.C. source 38 to provide a sinusoidal voltage, having an amplitude equal to the voltage of D.C. source 23 and an angular frequency $w_1$ causes the output voltage of amplifier 17 to be:

$$e_0 = \frac{E_{25}}{\alpha} \left( \frac{1}{1 + jw_1 R_{15} C_{16}} \right) \quad (3)$$

Equation (3) is derived by considering that the peak A.C. voltage developed across resistor 25 equals the D.C. voltage developed across that same resistor and can be represented as $E_{25}$. The A.C. impedance of capacitor 16 is utilized in considering the value of $Z_{in}$ in Equation (1) and the substitution $\beta = (I_s R_{15}/(E_{25})$ is made. From Equation (3), it is noted that the output voltage of amplifier 17 for an A.C. source differs from the D.C. output voltage of the amplifier by:

$$\frac{E_{25}}{\alpha} \left( \frac{jw_1 R_{15} C_{16}}{1 + jw_1 R_{15} C_{16}} \right) \quad (4)$$

and that the amplifier A.C. output voltage is always less than the D.C. output voltage. Equation (4) shows that for $w_1 = (1)/(R_{15}C_{16})$, the output voltage of amplifier 17 is 3 db less than the D.C. level, as should be expected in a network simulating the characteristics of a simple RC filter network.

After the system has been frequency standardized, switch 31 is returned to its normal position, as illustrated by FIG. 1, and the gauge is ready to be utilized for on-line measurement. Under on-line measuring conditions, source 11 and detector 12 are translated to a position whereby radiation from source 11 passes through the article 14 being monitored and an output voltage indicative of the properties of the article is derived from amplifier 17. The output voltage of amplifier 17 is coupled to chart recorder 34 to derive a visual indication of the properties of material 14 being analyzed.

In the alternative, an indication of the frequency content of the signal generated by detector 12 is obtained by connecting the output of amplifier 17 to spectrum analyzer 45 via switch 19. Spectrum analyzer 45 is preferably of the variance computer type and is designed to provide an indication of the variance of the signal applied to amplifier 17 for a plurality of different frequency spectrums. In one preferred embodiment, the spectrum analyzing variance computer 45 is described and illustrated by the copending application of Henry R. Chope, Ser. No. 376,366, filed June 29, 1964, and assigned to the same assignee as the present invention. As described in the copending Chope application, spectrum analyzer 45 derives a plurality of outputs, each indicative of the variance of the spectrum analyzer input signal and a different frequency range. Variance is a measure of the total derivation of a signal amplitude from the average signal amplitude and is defined as:

$$\sigma^2 = V = \frac{1}{T} \int_0^T \left[ f(t) dt \frac{1}{T} \int_0^T f(t) dt \right]^2 dt \quad (5)$$

where:
$\sigma^2$ is variance squared;
V is variance;
T is the time interval over which the variance is being computed;
$t$ is time; and
$f(t)$ is the signal whose variance is being computed.

The output signal derived from each channel of spectrum analyzer 45 is applied as a separate input to chart recorder 46 to provide a visual indication of the spectral content of the signal derived from detector 12 in each of the channels of analyzer 45. The readings taken from recorder 46 are accurate indications of the spectral content of the signal generated by detector 12 because the gauge of FIG. 1 has been frequency standardized. By frequency standardizing the gauge of FIG. 1, the amplitude versus frequency characteristics of the gauge are known to conform with a predetermined frequency response curve, such as curve 42 of FIG. 2. Since the gauge response is known, the spectral analysis performed by analyzer 45 can be assumed as reliable. On the other hand, however, if the gauge had not been standardized, and was operating in accordance with the response indicated by curve 43 or 44, FIG. 2, the amplitude of the spectrums fed to analyzer 45, and the resulting information from the analyzer, would have uncertain reliability. This is evident because of the inherent amplitude versus frequency characteristics of a gauge including reactive components, wherein the gauge is susceptible to operation at frequencies in proximity or beyond the gauge cut-off frequency.

While adjustments of tap 28, the value of capacitor 16 and the positions of switches 31, 33 and 37 have been described as being on a manual basis, it is to be understood that these elements can be activated remotely, through the use of suitable motors or motive means. In particular, the gauge illustrated by FIG. 1 is adapted to be utilized in a multi-gauge facility such as a cellophane film plant, wherein a plurality of radiation thickness gauges are provided, and the several gauges are controlled remotely from a single location. A system wherein a plurality of such gauges is included and controlled from a single, remote location, on a time multiplexed basis, is illustrated by the block diagram of FIG. 3.

Figure 3:
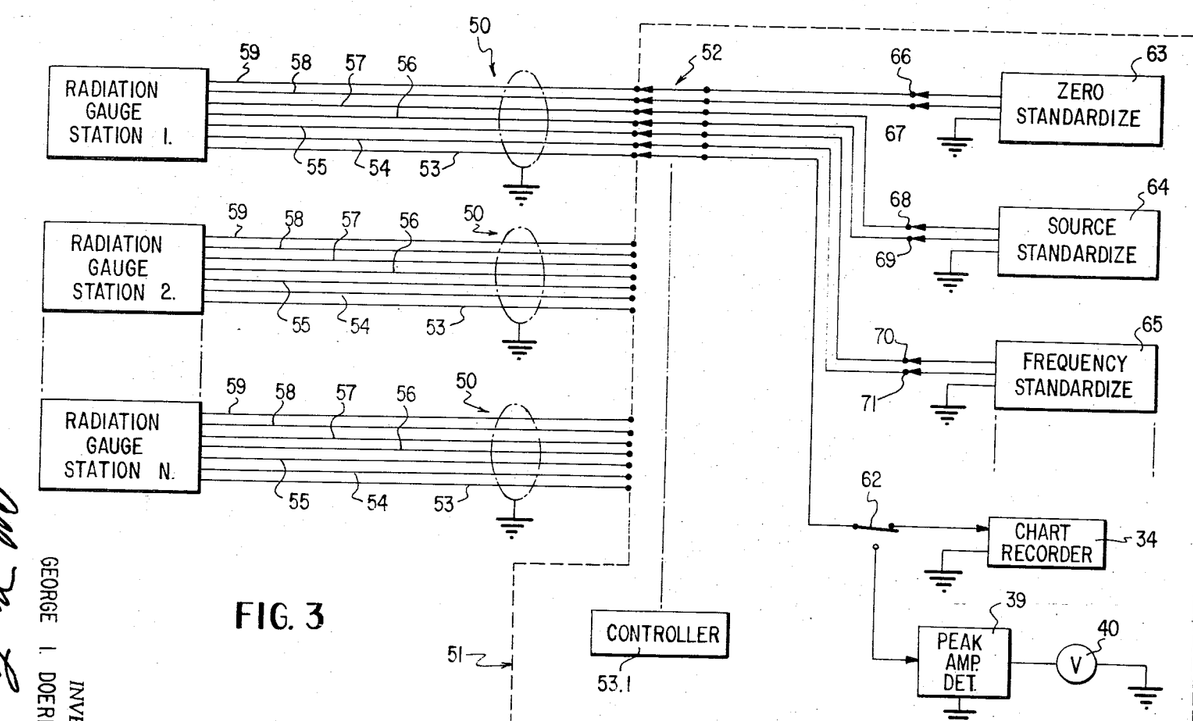
FIG. 3 is a block diagram indicating the manner in which a plurality of gauge stations of the type illustrated by FIG. 1 are interconnected with a single central controller and processor.

In the block diagram of FIG. 3, a plurality of radiation gauge stations of the type illustrated by FIG. 1, are designated as station 1, station 2 ... station n, and controlled from a single central station 51. Control signals are transmitted from central station 51 to the n radiation gauge stations and measurement signals are transmitted from the n stations to station 51 via n cables 50 and multiplexing switch 52, activated by controller 53.1. Each of the n gauge stations is connected to central station 51 by seven leads 53–59 in a different one of the n cables each of which includes a grounded outer conductor.

Each of the cables includes a single signal lead 53 and six control leads 54–59. Each of cables 50 is of a different length, depending upon the distance separating the particular radiation gauge station and central station 51, whereby the inherent, distributed parameter capacitance of each cable 50 is different and is therefore a factor in frequency standardizing each gauge.

The output signal of each gauge, as derived from amplifier 17, is fed to lead 53 in the corresponding cable 50 to multiplexing switch 52, at central station 51. From multiplexing switch 52, the output of amplifier 17 at each gauge is fed to switch 62, that couples signal analyzing apparatus to the output voltage derived by the amplifier 17 within each of the n radiation gauges.

To control all facets of gauge standardization, central station 51 is provided with three separate standardization panels, namely zero standardization panel 63, source standardization panel 64 and frequency standardization panel 65. Each of the standardization panels 63–65 includes two outputs, one for generating a bilevel command voltage for selectively activating an appropriate switch within the gauge connected to multiplexing switch 52 and a second output for selectively varying the value of a component that controls the particular standardization operation.

For selectively closing switch 33, FIG. 1, zero standardization panel 63 includes a command output terminal 66 that is connected via switch 52 to lead 59 in cable 50. In response to activation of zero standardize panel 63, an enabling voltage is derived at terminal 66 to close switch 33 in gauge station 1, assuming controller 53.1 has energized multiplexing switch 52 for connection with the cable 50 coupled to station 1. With switch 33 closed, switch 62 is activated by an operator so that the output voltage of amplifier 17 of gauge station 1 is connected to the input of chart recorder 34. Under these conditions, a zero output should be derived from amplifier 17 and indicated by chart recorder 34. The observer watching chart recorder 34 determines whether the output voltage of amplifier 17 is at the zero level desired and, if not, changes the bias level point within amplifier 17 by an appropriate control derived from zero standardizing panel 63 on terminal 67. The voltage on terminal 67 is coupled to lead 58 in the cable 50 connected to gauge station 1. The voltage at terminal 67 activates a motor (not shown), or some other suitable means, to change automatically the bias level of amplifier 17. Adjustment of the bias point of amplifier 17 from remote station 51 proceeds, with switch 33 closed, until a null output is derived from chart recorder 34. When a null output is read from recorder 34, the operator deactivates zero standardizing panel 63, whereby switch 33 is opened and the bias level set into amplifier 17 is maintained.

After amplifier 17 has been zero standardized, radiation gauge station 1 is ready to be source standardized. The first step in source standardization of radiation gauge station 1 is to activate standardization panel 64, whereby a control voltage is applied to its output terminal 68. The control voltage at terminal 68 is connected through multiplexing switch 52 to lead 57 in cable 50, and from thence to gauge 1. The control signal applied to lead 57 drives source 11 and detector 12 of gauge station 1 to an off sheet position and simultaneously switches contact 37 from tap 26 to the junction between rheostat 24 and potentiometer winding 25.

After detector 12 and source 11 have been driven to an off sheet position, and switch contact 37 activated to engage the junction between potentiometer winding 25 and rheostat 24, the output voltage of amplifier 17 is monitored from chart recorder 34 via the connection through lead 53 of the cable 50 connected to radiation gauge station 1 and switch 62. If the voltage now read from chart recorder 34 differs from a predetermined value, such as zero, the operator activates source standardization panel 64 so that a control voltage is supplied to terminal 69 and lead 56 of the cable 60 connected to radiation gauge station 1. The signal applied to lead 69 activates a motor or some other means for controlling the position of potentiometer 28. The position of potentiometer 28 is adjusted until the predetermined reading, e.g., zero, is derived from chart recorder 34.

After the predetermined value has been derived from chart recorder 34, radiation gauge station 1 can be considered as source standardized, and the activating potential applied to terminal 68 is removed by the operator, deenergizing source standardize panel 64. In response to deenergization of panel 64, switch contact 37 returns to engagement with potentiometer slider 26. Removal of the activation potential from lead 26 also initiates a control signal, transmitted to station 1, for enabling translation of source 11 and detector 12 to an on the sheet position. The tendency of source 11 and detector 12 to move into an on the sheet position is overcome with inhibit circuitry (not shown) at the gauge station if the radiation gauge station 1 is frequency standardized within a predetermined time interval after source standardization is completed.

Source 11 and detector 12 remain off sheet if the radiation gauge is to be frequency standardized if the operator activates frequency standardize panel 65 and causes a control potential to be supplied to terminal 70 within a predetermined time period (e.g. 10 seconds) after deactivation of source standardize panel 64. The potential applied to terminal 70 is coupled to lead 55 in cable 50 connected to radiation gauge station 1, to maintain source 11 and detector 12 at an off sheet position, while activating switch contact 31 so that it is decoupled from D.C. source 23 and connected to A.C. source 38. Source 38, as indicated supra, has a peak amplitude equal to the voltage of D.C. source 23 and preferably has a frequency equal to the desired cut-off frequency of radiation gauge station 1.

The response of radiation gauge station 1 to source 38 is coupled via lead 53 to amplitude detector 39 and volt-meter 40, which were connected in circuit with lead 53 via switch 62 simultaneously with the energization of terminal 70. Any adjustments necessary in the values of reactances in radiation gauge station 1 are performed by supplying a control signal via terminal 71 from frequency standardizing panel 65 to lead 54 of cable 50 connected to radiation gauge station 1 to control, for example, the value of capacitor 16. After frequency standardization has been accomplished, and a desired value has been read from D.C. meter 40, the energization potential on lead 70 is removed by deactivation of frequency standardizing panel 65, whereby radiation gauge station 1 is brought to an on sheet position.

While the zero and source standardization operations were described in conjunction with manual procedures, it is to be understood that these operations can be performed automatically, as described in the aforementioned Chope patent. In addition, the frequency standardization operation can be performed automatically, as described infra in conjunction with FIG. 4.

After radiation gauge station 1 has been zero, source and frequency standardized as described, controller 53.1 is activated to bring contacts 52 into engagement with the corresponding terminals of radiation gauge station 2. Activation of controller 53.1 to connect station 2 to central station 51 disconnects leads 53–59 in cable 50 from multiplexing switch 52. The disconnection of cable 50 for station 1 from switch 52 results in the connection of lead 53 in the same cable to a variance computing spectrum analyzer, not shown but of the type described supra in conjunction with FIG. 1, at central station 51. Each of the other stations is normally connected to a different such spectrum analyzer and is disconnected therefrom when multiplexing switch 52 is connected to the cable 50 coupled to the respective gauge station. Thereby, accurate spectral information regarding the process being monitored at stations 1, 2 . . . n is derived except while the particular station is being standardized. Radiation gauge station 2 is now zero, source and frequency standardized in the manner described for gauge station 1 under the control of remote station 51. In a similar manner, all of the radiation gauge stations in a particular facility can be controlled from a single location via time division multiplexing switch contacts 52. Because all of the gauge stations of FIG. 3 are zero, source and frequency standardized, the amplitude and frequency responses thereof are substantially the same and no requirement for compensation of readings from the several gauge stations exists.

While the system of FIG. 1 discloses a preferred embodiment for zero, source and frequency standardizing a nuclear radiation gauge, other techniques can be employed for accomplishing the same purpose. In particular, frequency standardization can be accomplished by modulating the response of the gauge by means other than A.C. source 38. Also, other circuit elements may be adjusted to change the gauge frequency response, or circuit elements can be added to provide the desired adjustment. The A.C. source can be connected at other points in the measuring system.

Figure 4:
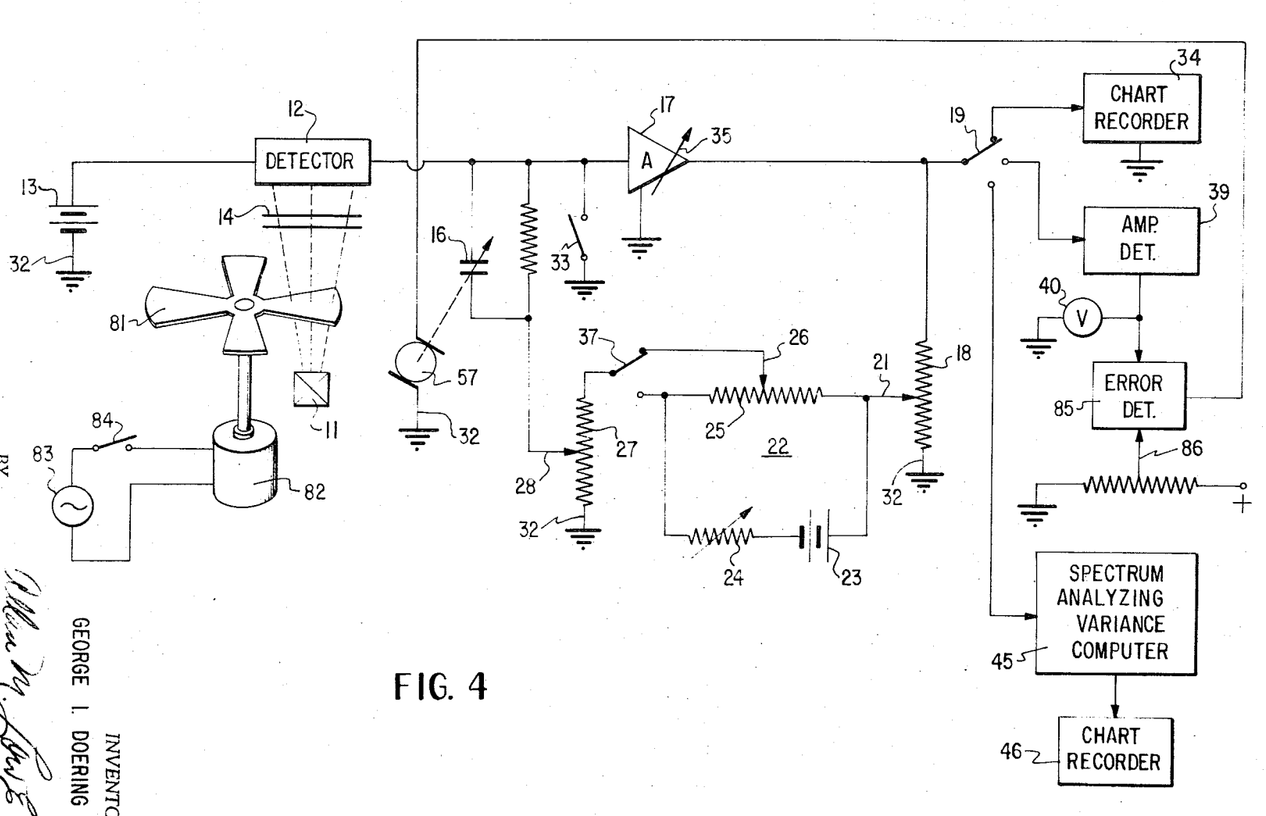
FIG. 4 is a circuit diagram of another embodiment of the invention.

Another system whereby frequency standardization can be accomplished is illustrated by the gauge configuration of FIG. 4, wherein a frequency modulation effect similar to that attained by A.C. source 38, FIG. 1, is derived by chopping radiation between source 11 and detector 12 at a predetermined frequency, while the source and detector are at an off sheet position. Chopping the radiation beam between source 11 and detector 12 is performed subsequently to zero and source standardization of the gauge. The first step is to insert shutter 81, rotated at constant velocity by synchronous motor 82, in the radiation path between source 11 and detector 12.

For purposes of simplicity in explanation and to provide a quantitative analysis of the gauge of FIG. 4, it is assumed that shutter 81 is a true sinusoid, and goes from a condition of complete transparency to nuclear radiation from source 11 to a condition of opacity by an attenuation factor of K. It is understood in practice, however, that shutter 81 has a step function configuration. Assuming a sinusoidal shutter configuration, the current derived from detector 12 in response to rotation of shutter 81 is represented by:

$$I_s = I_{so} - K/2 + K/2 \cos w_1 t \quad (6)$$

where:
$I_{so}$ is the D.C. current derived from detector 12 when it is source standardized; and
$w_1$ is the angular frequency imposed by shutter 81 on radiation from source 11. The D.C. portions of Equation (6), $I_{so} - K/2$, result in an output voltage of amplifier 17 in accordance with:

$$e_{0_{DC}} = \frac{1}{\alpha} \left[ \frac{\left(I_{so} - \frac{K}{2}\right) R_{15}}{\beta} - \gamma E_{25} \right] \quad (7)$$

while the A.C. portion of the current fed by detector 12 to the gauge of FIG. 4 causes amplifier 17 to derive an output voltage in accordance with:

$$e_{0_{AC}} = -\frac{\frac{K}{2}(R_{11}+R_{27})R_{15}}{\alpha\beta R_{27}(1+jw_1 R_{15} C_{16})} \quad (8)$$

where:
$R_{27}$ is the total resistance of potentiometer 27; and
$R_{11}$ is the parallel resistance of the portion of winding 25 between taps 21 and 22 and the remaining portion of winding 25 in series with rheostat 24, which equals:

$$\frac{\gamma R_{25}(2R_{24} - \gamma R_{25})}{R_{24} + R_{25}} \quad (9)$$

where:
$R_{25}$ is the total resistance of potentiometer winding 25 and
$R_{24}$ is the resistance of rheostat 24.

While the derivation of Equation (7) is relatively straightforward from Equation (1), by appropriate substitution of the D.C. terms in Equation (6) and elimination of the A.C. impedance of capacitor 16, the derivation of Equation (8) is complicated by the zero A.C. impedance of D.C. source 23. Because D.C. source 23 has substantially zero impedance to the A.C. oscillations imposed on the gauge by rotation of shutter 81, analysis of the system of FIG. 4 in response to A.C. signals differs from that for D.C. signals. In particular, the segment of potentiometer winding 25 represented by $\beta$, between tap 26 and the junction of potentiometer 25 with the positive terminal of D.C. source 23, must be considered as a resistance in parallel with the remaining portion $(1 - \beta)$ of potentiometer 25 and the resistance of rheostat 24.

The parallel resistance comprising rheostat 24 and winding 25 is series connected with the winding of potentiometer 27, whereby a voltage divider is formed for the voltage at tap 21 of potentiometer 18. The two segments of the voltage divider are: (1) the portion of winding 27 between tap 28 and ground terminal 32, and (2) the portion of winding 27 between tap 28 and the ungrounded winding end in series with the parallel resistance comprised of rheostat 24 and potentiometer winding 25. By assuming that the impedance loading tap 21 of potentiometer 21 is very large, the A.C. voltage at tap 28 of potentiometer 27 is written as:

$$e_{28} = \frac{\alpha \beta R_{27}}{R_{11} + R_{27}} e_0 \quad (10)$$

The A.C. voltage at tap 28, when coupled through resistance 15 and capacitor 16 to the high impedance input node of amplifier 17, results in a current:

$$i_{28} = \left(\frac{\alpha\beta R_{27}}{R_{11}+R_{27}}\right)\left(\frac{1+jw_1 R_{15} C_{16}}{R_{15}}\right) e_0 \quad (11)$$

since the input voltage of amplifier 17 can be considered as essentially zero. Since amplifier 17 is of the high input impedance type, the A.C. current generated by detector 12 must equal the A.C. current flowing from slider 28 to the input terminals of amplifier 17, whereby:

$$i_{28} = I_{s_{AC}} = \frac{K}{2} = \left(\frac{\alpha\beta R_{27}}{R_{11}+R_{27}}\right)\left(\frac{1+jw_1 R_{15} C_{16}}{R_{15}}\right) e_0 \quad (12)$$

Solving Equation (12) for $e_0$ yields Equation (8), supra.

A comparison of Equations (3) and (8), which respectively represent the A.C. output voltages of amplifier 17 for frequency standardization utilizing the systems of FIGS. 1 and 4, provides an indication of the similarity of the responses derived with the equipments of FIGS. 1 and 4. In particular, it is noted that in both equations, the denominator includes the frequency attenuating factor $(1 + jw_1 R_{15} C_{16})$. This factor indicates that the cut-off frequencies of both networks are determined by the values of high-meg resistor 15 and capacitor 16, whereby variations in the high-meg resistor control the frequency response of both systems and that both systems can be standardized by adjusting the value of capacitor 16. It is also to be understood, in both circuit configurations, that other frequency determining elements can be included in the gauge network for frequency standardizing purposes with similar results.

While the capacitors 16 of the gauges of FIGS. 1 and 4 can be adjusted in response to an operator observing voltmeter 40, responsive to amplitude detector 39, it is to be understood that automatic means can be utilized for determining the value of the reactance utilized for frequency standardization. In particular, the circuit of FIG. 4 includes error detector 85, responsive to the D.C. output voltage of peak amplitude detector 39 and a preset, D.C. voltage derived from potentiometer 86. The slider of potentiometer 86 is adjusted so that the voltage thereat corresponds with the desired output voltage of the gauge for the chopping frequency of shutter 81. Error detector 85 responds to the difference between the voltages derived from peak amplitude detector 39 and potentiometer 86 to derive an error signal that is supplied to D.C. motor 87. In response to the error voltage supplied thereto by error detector 85, motor 87 automatically adjusts the value of a frequency response controlling impedance, such as capacitor 16, to effect frequency standardization of the gauge.

While I have described and illustrated several specific embodiments of my invention, it will be clear that variations of the details of construction which are specifically illustrated and described may be made without departing from the true spirit and scope of the invention as defined in the appended claims. For example, the electronic servo system described herein can be replaced with an electromechanical servo, such as disclosed in Chope U.S. Pat. No. 2,790,945.

Another possible change is that detector 12 may be a scintillation crystal-photomultiplier or other radiation detector providing a pulse train having a pulse count rate correlated to the amount of radiation detected. Reference may be had to a copending application Ser. No. 559,128, filed June 21, 1966, for H. R. Chope and assigned to the same assignee as the present invention for an example of a digital nucleonic gauge for material properties. The techniques described above may be useful in standardizing the response of such digital instruments whose characteristics may change in time, resulting in lost counts and other anomalies leading to unacceptable and misleading errors.

What is claimed is:

1. A system for monitoring a property of an article comprising a plurality of penetrating radiation gauges responsive to the article, each of said gauges including: a source of penetrating radiation, an ionization detector responsive to said radiation from said source, while the property is being monitored said article intercepting the radiation from the source to modify the amount of said radiation impinging on the detector, said detector having a signal output terminal, a resistance having a value on the order to $5 \times 10^9$ ohms having one terminal connected to said output terminal, the value of said resistance having a tendency to vary in response to ambient conditions, a variable capacitor connected in shunt with said resistance, a DC amplifier connected to said output terminal, means for selectively short circuiting input terminals of said amplifier together, said amplifier having a tendency to drift and being provided with means for adjusting the bias of the amplifier so that a zero signal level is derived from an output terminal of the amplifier, whereby said gauge is zero standardized while the amplifier input terminals are short circuited together, a DC negative feedback loop for said amplifier connected between the amplifier output terminal and the other terminal of the resistance, said feedback loop including a potentiometer having a terminal connected to the amplifier output terminal and a tap adjusted to control the amplifier gain, said potentiometer tap being adjusted so that a predetermined DC voltage is derived at the amplifier output terminal while only air is intercepting the radiation, whereby the gauge sensitivity is standardized, said gauge having a frequency versus amplitude response similar to a low pass filter, said frequency versus amplitude response having a tendency to vary in response to the variations of the resistance, whereby for a predetermined frequency the AC voltage derived at the amplifier output terminal is a predetermined amplitude below the DC voltage derived at the amplifier output terminal while the gauge is source standardized, an AC source at said predetermined frequency selectively connected between said tap and the other terminal of the resistance; control means selectively responsive to the voltage at the output terminal of the amplifier of each gauge, multiplexing switch means for selectively connecting the control means to each gauge, said control means including: means for activating the short circuiting means for the amplifier input terminals, means for activating the amplifier bias adjusting means while the short circuiting means is activated, means for adjusting the relative position of the gauge and article so that only air is intercepting radiation from the source, means for adjusting the position of the tap while only air is intercepting said radiation, means for connecting the AC source between the tap and other terminal of the resistance while only air is intercepting said radiation, means responsive to a source having a voltage level indicative of the predetermined amplitude and the level of the AC voltage derived at the amplifier output terminal while the AC source is connected between the tap and other resistance terminal for deriving an error signal, and means responsive to the error signal for adjusting the value of the capacitor until the AC voltage at the amplifier output terminal is substantially equal to the predetermined amplitude.

* * * * *